US012768808B2

(12) United States Patent
Yu et al.

(10) Patent No.: US 12,768,808 B2
(45) Date of Patent: Oct. 20, 2026

(54) GLUCOSE ELECTROCHEMICAL SENSOR AND PREPARATION METHOD THEREOF

(71) Applicant: MicroTech Medical (Hangzhou) Co., Ltd., Hangzhou (CN)

(72) Inventors: Fei Yu, Hangzhou (CN); Yuhui Lu, Hangzhou (CN)

(73) Assignee: Micro Tech Medical (Hangzhou) Co., Ltd., Hangzhou (CN)

( * ) Notice: Subject to any disclaimer, the term of this patent is extended or adjusted under 35 U.S.C. 154(b) by 506 days.

(21) Appl. No.: 18/258,393

(22) PCT Filed: Aug. 10, 2021

(86) PCT No.: PCT/CN2021/111770
§ 371 (c)(1),
(2) Date: Jun. 20, 2023

(87) PCT Pub. No.: WO2022/037439
PCT Pub. Date: Feb. 24, 2022

(65) Prior Publication Data
US 2024/0044831 A1 Feb. 8, 2024

(30) Foreign Application Priority Data
Aug. 18, 2020 (CN) ........................ 202010832447.0

(51) Int. Cl.
*G01N 27/327* (2006.01)
*C08L 5/08* (2006.01)

(52) U.S. Cl.
CPC ............ *G01N 27/3271* (2013.01); *C08L 5/08* (2013.01)

(58) Field of Classification Search
CPC .... G01N 27/26; G01N 27/30; G01N 27/3271; G01N 27/3335; C08F 126/06; C08G 69/48
See application file for complete search history.

(56) References Cited

U.S. PATENT DOCUMENTS 5,320,725 A * 6/1994 Gregg .................... C12Q 1/002 436/806
2012/0132525 A1 5/2012 Liu
(Continued)

FOREIGN PATENT DOCUMENTS

CN 101027314 A 8/2007
CN 102165070 A 8/2011
(Continued)

OTHER PUBLICATIONS

B.A. Gregg, Redox Polymer Films Containing Enzymes. 1. A Redox-Conducting Epoxy Cement: Synthesis, Characterization, and Electrocatalytic Oxidation of Hydroquinone, J. Phys. Chem. 1991 (95), pp. 5970-5975 (Year: 1991).*
(Continued)

*Primary Examiner* — C. Sun
(74) *Attorney, Agent, or Firm* — Sisson & Banyas, Attorneys at Law, LLC; Edwin A. Sisson

(57) ABSTRACT

A glucose electrochemical sensor based on a hydrogel of a cationic redox polymer containing a transition metal complex medium, and a preparation method thereof. A sensing layer of the glucose electrochemical sensor comprises a cationic redox polymer containing a transition metal complex medium, glucose oxidase, and a crosslinking agent. The glucose electrochemical sensor can specifically measure glucose, and the linear correlation coefficient between a stable current signal of the glucose electrochemical sensor and the glucose concentration is high. The influence of interfering substances on glucose measurement can be eliminated, and the influence of oxygen concentration in a solution on glucose measurement can also be eliminated.

5 Claims, 2 Drawing Sheets

(56) References Cited

U.S. PATENT DOCUMENTS

| | | | | |
|---|---|---|---|---|
| 2016/0293147 | A1 | 10/2016 | Tanabe | |
| 2016/0296147 | A1* | 10/2016 | Mao | A61B 5/14532 |
| 2019/0170739 | A1* | 6/2019 | Garner | G01N 33/54313 |

FOREIGN PATENT DOCUMENTS

| | | | |
|---|---|---|---|
| CN | 112067671 | A | 12/2020 |
| WO | 1992012254 | A1 | 7/1992 |
| WO | 2019235755 | A1 | 12/2019 |

OTHER PUBLICATIONS

Thioglycolic Acid _PubChem (Year: 2025).*
International Search Report of PCT/CN2021/111770, published as WO2022/037439 on Feb. 24, 2022.

* cited by examiner

GLUCOSE ELECTROCHEMICAL SENSOR AND PREPARATION METHOD THEREOF

TECHNICAL FIELD

This invention relates to a glucose electrochemical sensor based on a hydrogel of a cationic redox polymer containing a transition metal complex medium, and a preparation method thereof. It belongs to the field of electrochemical sensors.

BACKGROUND

Diabetes, a common chronic disease, is caused by uncontrolled blood sugar concentrations in the human body. It seriously threatens human health. If the blood sugar concentration in the human body continues to be too high, it is likely to induce hyperglycemia, and further lead to a series of complications such as blindness, cardiovascular disease, and kidney failure. Too low blood sugar concentration may cause hypoglycemia or even death.

To date, there isn't a good medical means that can cure diabetes yet. In most cases, physicians are trying to fulfill the therapeutic purpose by controlling the patient's blood sugar concentration. It is essential to continuously monitor the blood sugar levels in real time to effectively control the blood sugar concentration. Therefore, glucose sensors have been developed for accurately measuring blood glucose concentrations.

As one of the various glucose measurement methods, the electrochemical analytic method involves some simple and quantitative operation modes and has been widely used in glucose sensors. Such a method has a fast response time and covers a broad measurement range; and the measured electrochemical signals can be converted into the corresponding glucose concentrations. It can efficiently achieve the quantitative analysis of the glucose concentrations.

However, there are also some problems existing in the currently-available glucose electrochemical sensors, which mainly include:

1. interfering substances may greatly affect glucose measurement; and
2. glucose electrochemical sensors prepared based on the reaction mechanism underlying the highly specific glucose oxidase requires oxygen consumption when they are in use, and the lack of oxygen will lead to inaccurate measured results.

To address these problems, the present invention provides a glucose electrochemical sensor based on a hydrogel of a cationic redox polymer containing a transition metal complex medium, and a preparation method thereof. The glucose electrochemical sensor provided by the present invention can specifically measure glucose levels; and its stable current signal has a high linear correlation coefficient with glucose concentration. Thus, it can eliminate the influences of interfering substances and oxygen concentrations in the solution on glucose measurement, thereby overcoming the deficiencies existing in the prior art. Therefore, the glucose electrochemical sensor based on the hydrogel of the cationic redox polymer containing the transition metal complex medium according to the present invention has greater application value in continuous glucose measurement.

SUMMARY OF THE INVENTION

The invention relates to a glucose electrochemical sensor based on a hydrogel of the cationic redox polymer containing the transition metal complex medium and a preparation method thereof. The electrochemical sensor provided by this invention can continuously measure glucose concentrations rapidly and accurately.

To this end, the present invention adopts the following technical solutions:

A method for preparing a glucose electrochemical sensor, which is based on a hydrogel of acationic redox polymer containing a transition metal complex medium, wherein the method comprises the following steps:

A. grafting the transition metal complex medium onto the side chain of the cationic polymer to obtain a cationic redox polymer containing the transition metal complex medium,
B. dissolving the cationic redox polymer containing the transition metal complex medium obtained in step A in deionized water to obtain an aqueous solution of the cationic redox polymer containing the transition metal complex medium,
C. coating a solution mixture of the aqueous solution of the cationic redox polymer containing the transition metal complex medium obtained in step B, and an aqueous solution of glucose oxidase and an aqueous solution of crosslinking agent onto the surface of an electrode, and
D. drying the electrode by placing it into a vacuum drying oven after evaporation of the water to obtain a glucose electrochemical sensor based on a hydrogel of the cationic redox polymer containing the transition metal complex medium.

Further, in the method for preparing the glucose electrochemical sensor according to the present invention, the cationic redox polymer containing the transition metal complex medium obtained in step A has a chemical formula shown below:

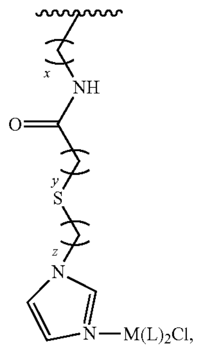

wherein, M is a transition metal;

L is a ligand in a transition metal complex that is selected from derivatives of diimidazoles and dipyridines; and x, y, z are the lengths of the hydrocarbon chains in the molecule, respectively.

Further, in the method for preparing the glucose electrochemical sensor according to the present invention, the transition metal M used in step A is one or more of iron, cobalt, ruthenium, osmium, and vanadium.

Further, in the method for preparing the glucose electrochemical sensor according to the present invention, the ligand L in the transition metal complex used in step A is one or more of N,N'-dimethyl-2,2'-biimidazole, 2,2'-bipyridine, 4,4'-dimethyl-2,2'-bipyridine, 4,4'-dimethoxy-2,2'-bipyridine, and 4,4'-dichloro-2,2'-bipyridines.

Further, in the method for preparing the glucose electrochemical sensor according to the present invention, the cationic redox polymer used in step A is one or more selected from natural polymers of chitosan with amino groups in the side chain, N-carboxymethyl chitosan, O-carboxymethyl chitosan, hydroxypropyl chitosan, and N-maleoylated chitosan, and synthetic polymers of polylysine, polyallylamine, polyvinylimine, and polyarginine.

Further, in the method for preparing the glucose electrochemical sensor according to the present invention, the transition metal complex medium in step A is grafted onto the side chain of the cationic polymer via 4-20 covalent bonds, i.e., $4 \le x+y+z \le 20$.

Further, in the method for preparing the glucose electrochemical sensor according to the present invention, the crosslinking agent used in step C is one or more of glutaraldehyde, polyethylene glycol diglycidyl ether, and genipin; wherein genipin has a structural formula of:

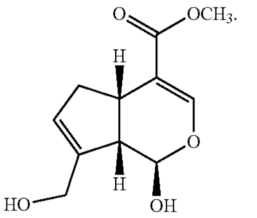 [SMILES: COC(=O)C1=CO[C@@H](O)[C@@H]2C(CO)=CC[C@H]12]

Further, in the method for preparing the glucose electrochemical sensor according to the present invention, the solution mixture in step C is obtained by blending the aqueous solution of the cationic redox polymer containing the transition metal complex medium obtained in step A, the aqueous solution of glucose oxidase and the aqueous solution of crosslinking agent at 0-45° C. for 45 minutes to 2 days.

Further, in the method for preparing the glucose electrochemical sensor according to the present invention, the solution mixture is obtained by blending 1-20 mg/mL of the aqueous solution of the cationic redox polymer containing the transition metal complex medium, 1-10 mg/mL of the aqueous solution of glucose oxidase and 1-10 mg/mL of the aqueous solution of crosslinking agent; and the mass ratio of the cationic redox polymer containing the transition metal complex medium, the glucose oxidase and the cross-linking agent in the solution mixture is 1:(0.1-5):(0.01-0.5).

The present invention also relates to a glucose electrochemical sensor prepared by the above method.

The glucose electrochemical sensor prepared by the method of the present invention can achieve the following beneficial effects:

1. The glucose electrochemical sensor according to the present invention can specifically measure glucose levels; and its stable current signal has a high linear correlation coefficient with glucose concentration.
2. The glucose electrochemical sensor according to the present invention can eliminate the influence of interfering substances on glucose measurement.
3. The glucose electrochemical sensor according to the present invention can also eliminate the influence of oxygen concentrations in the solution on glucose measurement.

DETAILED DESCRIPTION OF THE INVENTION

Figure 1:
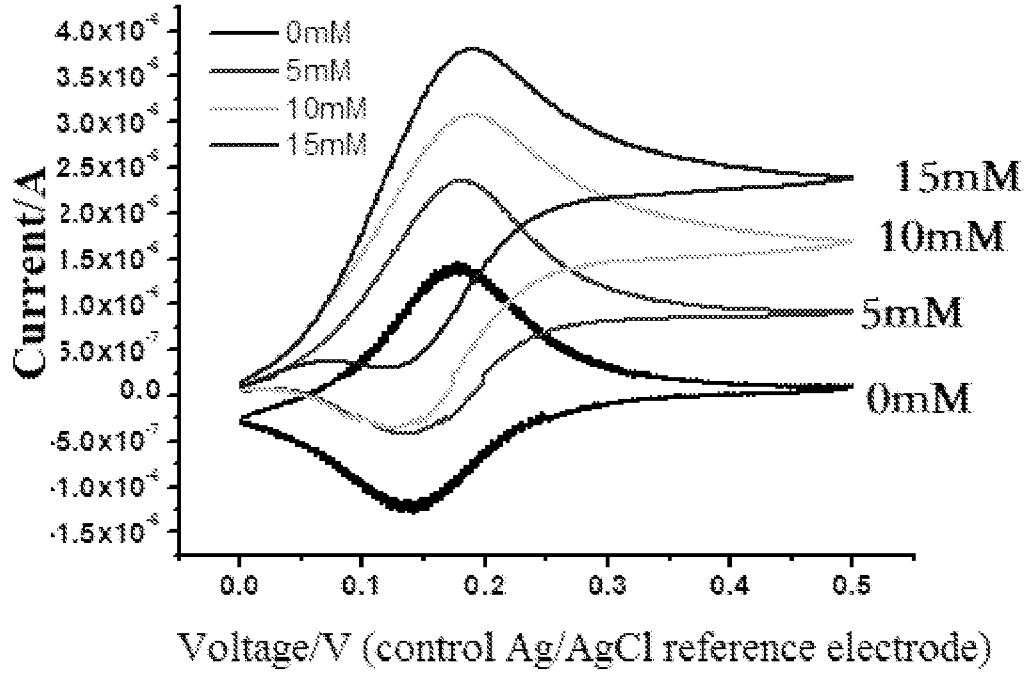
FIG. 1 shows redox curves of the glucose electrochemical sensors based on the hydrogel of the cationic redox polymer containing transition metal complex medium in PBS solutions with 0 mM, 10 mM, and 15 mM of glucose.

In conjunction with the accompanying drawing, the present invention is described in detail below.

In order to illustrate the objects, technical solutions and advantages of the present invention in greater clarity, the present invention will be further described in detail in conjunction with the accompanying drawings and examples below. It should be understood that the specific examples described here are merely used to explain the present invention, without limiting the present invention.

Example 1: A method for preparing the glucose electrochemical sensor based on the hydrogel of the cationic redox polymer containing the transition metal complex medium, comprising the following steps:

1) 1 mmol of vinylimidazole, 1 mmol of 11-mercaptoundecanoic acid and 12 mg of azobisisobutyronitrile as an initiator were added into 5 mL of ethanol, and reacted overnight at 70° C. After completion of the reaction, the resulting solution was cooled to room temperature, slowly added dropwise into 50 mL of deionized water, and precipitated. After filtered, the filter cake was dried in an oven.
2) 1.5 mmol of the product obtained in step 1) and 1 mmol of Os-$(bpy)_2Cl$ were added into 5 mL of ethanol, and reacted under reflux for 3 days. After completion of the reaction, the resulting solution was cooled to room temperature, and slowly added dropwise into 50 mL of deionized water. The resulting solution was filtered, and the filtrate was collected and dried in an oven to obtain the product.
3) 1 mmol of the product obtained in step 2) was dissolved in deionized water; 28 mg of EDC (ethylene dichloride) and 16 mg of NHS (N-hydroxysuccinimide) were added to activate the carboxyl group; 0.468 g of polyallylamine was added. The resulting solution was reacted at room temperature for 2 days. The system was dialyzed and lyophilized to obtain the product.
4) 7.8 μL of an aqueous solution (10 mg/mL) of the product obtained in step 3), 16 μL of an aqueous solution of glucose oxidase (10 mg/mL) and 6 μL of an aqueous solution of polyethylene glycol diglycidyl ether (2.5 mg/mL) were blended, and then crosslinked at room temperature for 2 days.

5) The gel system was added dropwise to the surface of an electrode; and after evaporation of the water, the electrode was placed in a vacuum environment for 2 days to obtain the target electrode.

The redox curves of the prepared electrode were tested in PBS solutions (phosphate buffered saline solutions) with 0, 5 mM, 10 mM, and 15 mM of glucose. The results were shown in FIG. 1. The redox peak of the electrode was 250 mV or less, which is far lower than the voltages required for catalytic oxidation of interfering substances such as acetaminophen and ascorbic acid. Therefore, the electrode has excellent ability to resist interference.

Example 2: A method for preparing the glucose electrochemical sensor based on the hydrogel of the cationic redox polymer containing the transition metal complex medium, comprising the following steps:

1) 1 mmol of vinylimidazole, 1 mmol of 16-mercaptohexadecanoic acid and 12 mg of azobisisobutyronitrile as an initiator were added into 5 mL of acetone, and reacted overnight at After completion of the reaction, the solution was cooled to room temperature, slowly added dropwise into 50 mL of deionized water, and precipitated. After filtered, the filter cake was dried in an oven.
2) 1.7 mmol of the product obtained in step 1) and 1 mmol of Rh-(dimethyl-bpy)$_2$Cl were added into 5 mL of ethanol, and reacted under reflux for 3 days. After completion of the reaction, the resulting solution was cooled to room temperature, and slowly added dropwise into 50 mL of deionized water. The resulting solution was filtered, and the filtrate was collected and dried in an oven to obtain the product.
3) 1 mmol of the product obtained in step 2) was dissolved in deionized water; 28 mg of EDC and 16 mg of NHS were added to activate the carboxyl group; 0.641 g of polyallylamine was added. The resulting solution was reacted at room temperature for 2 days. The system was dialyzed and lyophilized to obtain the product.
4) 10 μL of an aqueous solution (5 mg/mL) of the product obtained in step 3), 2 μL of an aqueous solution of glucose oxidase (10 mg/mL) and 1 μL of an aqueous solution of polyethylene glycol diglycidyl ether (2 mg/mL) were blended, and then crosslinked at 45° C. for 40 minutes. The gel system was added dropwise to the surface of an electrode; and after evaporation of the water, the electrode was placed in a vacuum environment for 2 days to obtain the target electrode.

Figure 2:
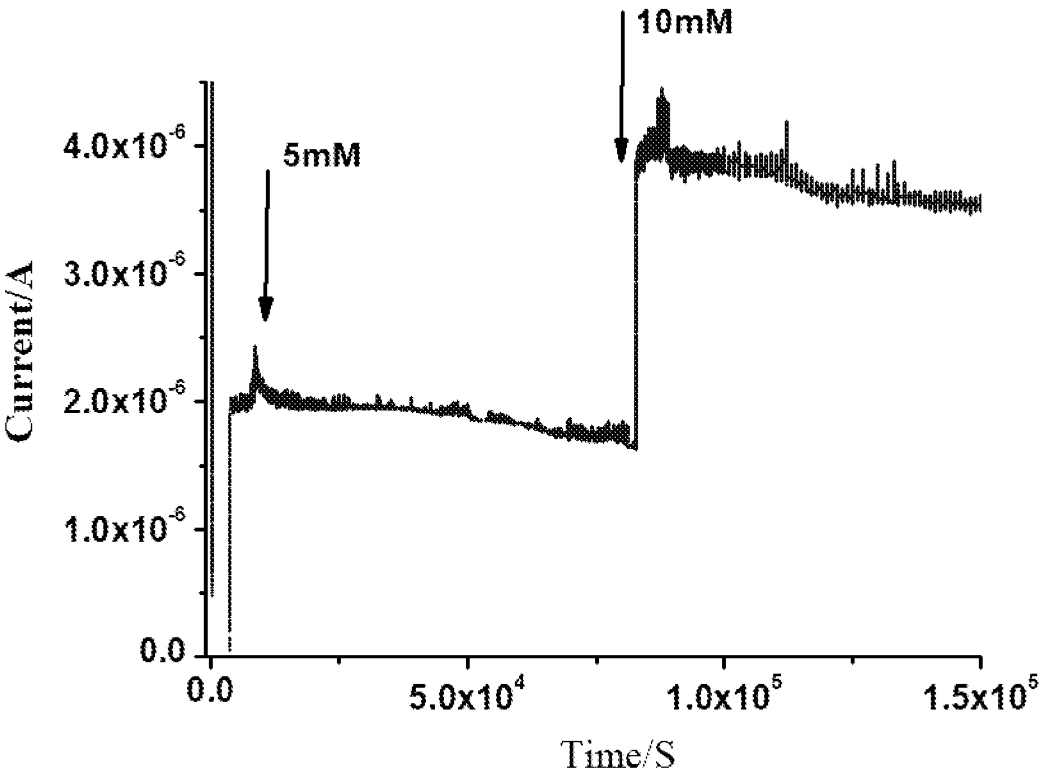
FIG. 2 shows the current curves over time of the glucose electrochemical sensor based on the hydrogel of the cationic redox polymer containing the transition metal complex medium in the PBS solution with 10 mM of glucose.

The current curves over time of the prepared electrode were tested in PBS solution with 15 mM of glucose. The results were shown in FIG. 2. The electrode had a good response in PBS solution with of glucose. After addition of glucose, the electrode can give a response signal within 10 seconds.

Example 3: A method for preparing the glucose electrochemical sensor based on the hydrogel of the cationic redox polymer containing the transition metal complex medium, comprising the following steps:

1) 1 mmol of allyl imidazole, 1 mmol of 1-mercaptopropionic acid and 12 mg of azobisisobutyronitrile as an initiator were added into 5 mL of 1,4-dioxane, and reacted at 75° C. for 12 hours. After completion of the reaction, the solution was cooled to room temperature, slowly added dropwise into 50 mL of deionized water, and precipitated. After filtered, the filter cake was dried in an oven.
2) 1.5 mmol of the product obtained in step 1) and 1 mmol of Ru-(bpy)$_2$Cl were added into 5 mL of ethanol, and reacted under reflux for 3 days. After completion of the reaction, the resulting solution was cooled to room temperature, and slowly added dropwise into 50 mL of deionized water. The resulting solution was filtered, and the filtrate was collected and dried in an oven to obtain the product.
3) 1 mmol of the product obtained in step 2) was dissolved in deionized water; 28 mg of EDC and 16 mg of NHS were added to activate the carboxyl group; 0.78 g of polylysine was added. The resulting solution was reacted at room temperature for 2 days. The system was dialyzed and lyophilized to obtain the product.
4) 7.8 μL of an aqueous solution (10 mg/mL) of the product obtained in step 3), 16 pt of an aqueous solution of glucose oxidase (10 mg/mL) and 6 μL of an aqueous solution of genipin (2.5 mg/mL) were blended, and then crosslinked at 40° C. for 2 days.
5) The gel system was added dropwise to the surface of an electrode; and after evaporation of the water, the electrode was placed in a vacuum environment for 2 days to obtain the target electrode.

Figure 3:
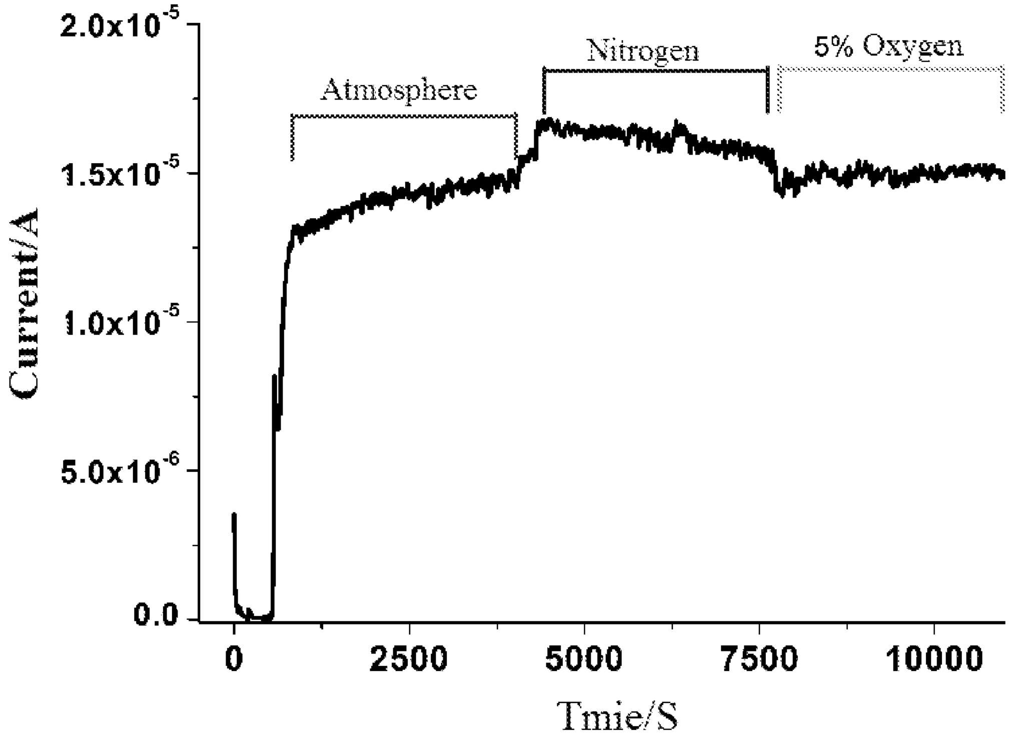
FIG. 3 shows the current curves over time of the glucose electrochemical sensor based on the hydrogel of the cationic redox polymer containing the transition metal complex medium in the PBS solution with 10 mM of glucose. As the oxygen concentration in the solution changes, the signal value varies slightly.
Figure 4:
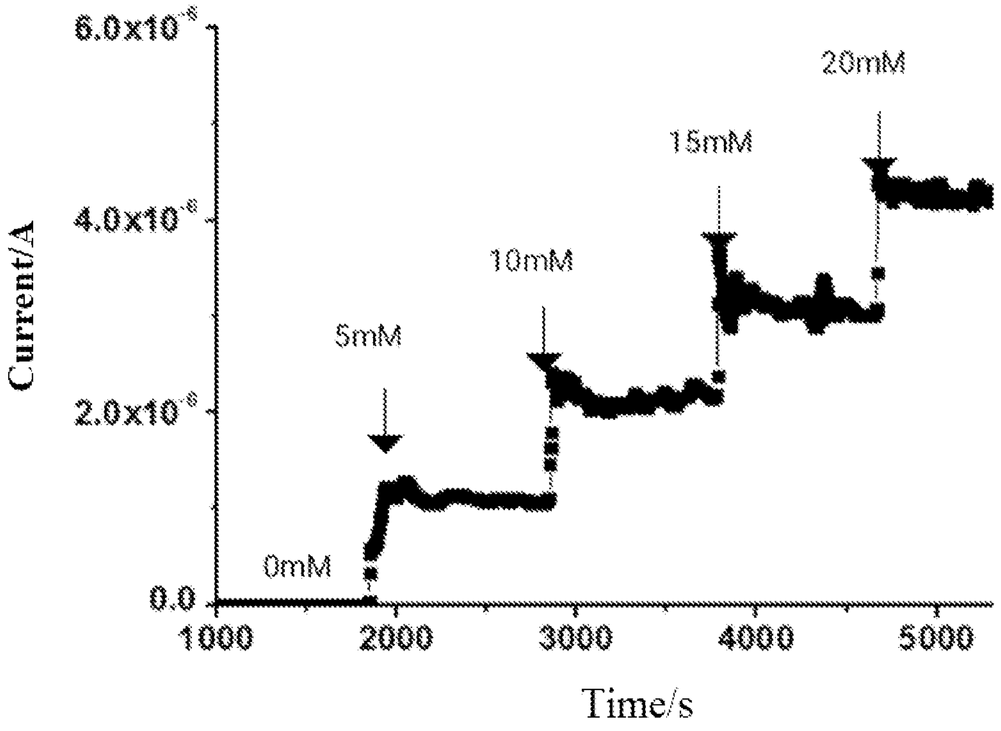
FIG. 4 shows the current curves over time of the glucose electrochemical sensor based on the hydrogel of the cationic redox polymer containing transition metal complex medium in PBS solutions with 5 mM, 10 mM, 15 mM, and 20 mM of glucose. As the glucose concentration increases, the current signal value also increases; and the glucose concentrations have a positive linear relationship with the current signal values.

The current curves over time of the prepared electrode were tested in PBS solution with 10 mM of glucose under the atmospheres with different gases. The results were shown in FIG. 3. As the gas atmosphere in the solution changes, the signal value varies slightly. This result showed that the prepared electrode is not sensitive to a change in the oxygen concentrations in the tested environments.

Example 4: A method for preparing the glucose electrochemical sensor based on the hydrogel of the cationic redox polymer containing the transition metal complex medium, comprising the following steps:

1) 1 mmol of vinylimidazole, 1 mmol of 4-mercaptohydrocinnamic acid and 12 mg of azobisisobutyronitrile as an initiator were added into 5 mL of N,N-dimethylformamide, and reacted at 80° C. for 8 hours. After completion of the reaction, the solution was cooled to room temperature, slowly added dropwise into 50 mL of deionized water, and precipitated. After filtered, the filter cake was dried in an oven.
2) 2 mmol of the product obtained in step 1) and 1 mmol of Os-(dimethoxy-bpy)$_2$Cl were added into 5 mL of ethanol, and reacted under reflux for 3 days. After completion of the reaction, the resulting solution was cooled to room temperature, and slowly added dropwise into 50 mL of deionized water. The resulting solution was filtered, and the filtrate was collected and dried in an oven to obtain the product.
3) 1 mmol of the product obtained in step 2) was dissolved in deionized water; 28 mg of EDC and 16 mg of NHS were added to activate the carboxyl group; 0.645 g of polyallylamine was added. The resulting solution was reacted at room temperature for 2 days. The system was dialyzed and lyophilized to obtain the product.
4) 7 μL of an aqueous solution (15 mg/mL) of the product obtained in step 3), 2 μL of an aqueous solution of glucose oxidase (8 mg/mL) and 2 μL of an aqueous solution of polyethylene glycol diglycidyl ether (2 mg/mL) were blended, and then crosslinked at room temperature for 2 days. The gel system was added dropwise to the surface of an electrode; and after evaporation of the water, the electrode was placed in a vacuum environment for 2 days to obtain the target electrode.

The current curves over time of the prepared electrode were measured in PBS solutions with 0, 5 mM, 10 mM, 15 mM, and 20 mM of glucose. The results were shown in FIG.

4. As the glucose concentration increases, the current signal value also increases; and the glucose concentrations and the current signal values had a positive linear relationship. This result showed that the prepared electrode can better measure the glucose levels within the glucose concentration range of 0 to Example 5: A method for preparing the glucose electrochemical sensor based on the hydrogel of the cationic redox polymer containing the transition metal complex medium, comprising the following steps:

1) 1 mmol of acrylimidazole, 1 mmol of thioglycolic acid and 12 mg of azobisisobutyronitrile as an initiator were added into 5 mL of methanol, and reacted overnight at 65° C. After completion of the reaction, the solution was cooled to room temperature, slowly added dropwise into 50 mL of deionized water, and precipitated. After filtered, the filter cake was dried in an oven.
2) 1.5 mmol of the product obtained in step 1) and 1 mmol of Os-(dichloro-bpy)$_2$Cl were added into 5 mL of ethanol, and reacted under reflux for 3 days. After completion of the reaction, the resulting solution was cooled to room temperature, and slowly added dropwise into 50 mL of deionized water. The resulting solution was filtered, and the filtrate was collected and dried in an oven to obtain the product.
3) 1 mmol of the product obtained in step 2) was dissolved in deionized water; 28 mg of EDC and 16 mg of NHS were added to activate the carboxyl group; and an aqueous solution of chitosan (containing 0.806 g of chitosan) was added. The resulting solution was reacted at room temperature for 2 days. The system was dialyzed and lyophilized to obtain the product.
4) 5 μL of an aqueous solution (10 mg/mL) of the product obtained in step 3), 2 μL of an aqueous solution of glucose oxidase (5 mg/mL) and 3 μL of an aqueous solution of polyethylene glycol diglycidyl ether (3 mg/mL) were blended, and then crosslinked at room temperature for 2 days.
5) The gel system was added dropwise to the surface of an electrode; and after evaporation of the water, the electrode was placed in a vacuum environment for 2 days to obtain the target electrode.

We claim:

1. A method for preparing a glucose electrochemical sensor, which is based on a hydrogel of a cationic redox polymer containing a transition metal complex medium, wherein the method comprises the following steps:

A. reacting the transition metal complex medium with a nitrogen-containing heterocyclic compound and a terminal mercapto alkyl acid to obtain a short-chain graftable molecule containing the transition metal complex; said terminal mercapto alkyl acid being one or more of thioglycolic acid, mercaptopropionic acid, 4-mercaptohydrocinnamic acid, 11-mercaptoundecanoic acid, 16-mercaptohexadecanoic acid; said nitrogen-containing heterocyclic compound being one or more of vinylimidazole, allyl imidazole;

B. grafting the short-chain graftable molecule onto the side chain of a cationic polymer backbone molecule to obtain the cationic redox polymer containing the transition metal complex medium having a chemical formula shown below:

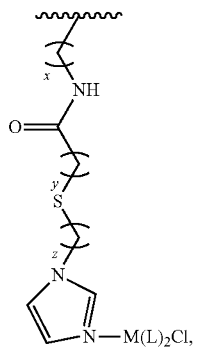

wherein,

M is a transition metal;

L is a ligand in the transition metal complex that is selected from derivatives of diimidazoles and dipyridines; and x is the length of the hydrocarbon chains on the side chain of the cationic redox polymer molecule;

y is the length of the hydrocarbon chains on the terminal mercapto alkyl acid molecule;

z is the length of the hydrocarbon chains on the vinyl nitrogen-containing heterocyclic compound grafted with the transition metal complex, and $4 \leq x+y+z \leq 20$;

wherein the cationic polymer backbone molecule is one or more selected from natural polymers of chitosan with amino groups in the side chain, N-carboxymethyl chitosan, O-synthetic carboxymethyl chitosan, hydroxypropyl chitosan, and N-maleoylated chitosan, and polymers of polylysine, polyallylamine, polyvinylimine, and polyarginine;

C. dissolving the cationic redox polymer containing the transition metal complex medium obtained in step B in deionized water to obtain an aqueous solution of the cationic redox polymer containing the transition metal complex medium;

D. coating a mixed solution of the aqueous solution of the cationic redox polymer containing the transition metal complex medium obtained in step C, and an aqueous solution of glucose oxidase and an aqueous solution of crosslinking agent onto the surface of an electrode; the mass ratio of the cationic redox polymer containing the transition metal complex medium, the glucose oxidase and the crosslinking agent in the mixed solution is 1:(0.1-5):(0.01-0.5); and E. drying the electrode by placing it into a vacuum drying oven after evaporation of the water, to obtain the glucose electrochemical sensor based on the hydrogel of the cationic redox polymer containing the transition metal complex medium.

2. The preparation method according to claim 1, wherein the transition metal M used in step A is one or more of iron, cobalt, ruthenium, osmium and vanadium.

3. The preparation method according to claim 1, wherein the ligand L in the transition metal complex used in step A is one or more of N,N' dimethyl-2,2' biimidazole; 2,2' bipyridine; 4,4' dimethyl-2,2'-bipyridine; 4,4' dimethoxy-2, 2'-bipyridine; and 4,4' dichloro-2,2'-bipyridines.

4. The preparation method according to claim 1, wherein the crosslinking agent used in step D is one or more of glutaraldehyde, polyethylene glycol diglycidyl ether, and genipin.

5. The preparation method according to claim 1, wherein the mixed solution in step D is obtained by blending the aqueous solution of the cationic redox polymer containing the transition metal complex medium obtained in step B, the aqueous solution of glucose oxidase and the aqueous solution of crosslinking agent at 0-45° C. for 45 minutes to 2 days.

* * * * *